United States Patent
Nangia et al.

(10) Patent No.: US 11,917,099 B2
(45) Date of Patent: Feb. 27, 2024

(54) METHOD AND SYSTEM FOR PLAYING MEDIA CONTENT IN TELECOMMUNICATION NETWORK

(71) Applicants: Rajender Kumar Nangia, New Delhi (IN); Rajvir Singh Juneja, Gurgaon (IN)

(72) Inventors: Rajender Kumar Nangia, New Delhi (IN); Rajvir Singh Juneja, Gurgaon (IN)

( * ) Notice: Subject to any disclaimer, the term of this patent is extended or adjusted under 35 U.S.C. 154(b) by 0 days.

(21) Appl. No.: 17/276,152

(22) PCT Filed: Jun. 5, 2020

(86) PCT No.: PCT/IB2020/055314
§ 371 (c)(1),
(2) Date: Mar. 14, 2021

(87) PCT Pub. No.: WO2020/245787
PCT Pub. Date: Dec. 10, 2020

(65) Prior Publication Data
US 2022/0038574 A1    Feb. 3, 2022

(30) Foreign Application Priority Data
Jun. 5, 2019 (IN) .............................. 201911022264

(51) Int. Cl.
*H04M 3/42* (2006.01)
*G06Q 30/0251* (2023.01)
*H04L 67/06* (2022.01)

(52) U.S. Cl.
CPC .... *H04M 3/42051* (2013.01); *G06Q 30/0267* (2013.01); *H04L 67/06* (2013.01); *H04M 3/42017* (2013.01); *H04M 2203/553* (2013.01)

(58) Field of Classification Search
CPC ......... H04M 3/42051; H04M 3/42017; H04M 2203/553; H04M 3/02; G06Q 30/0267; H04L 67/06; H04L 67/568
See application file for complete search history.

(56) References Cited

U.S. PATENT DOCUMENTS

| | | | |
|---|---|---|---|
| 8,660,247 B1 * | 2/2014 | Brown | G06Q 30/0241 379/142.06 |
| 2009/0022283 A1 * | 1/2009 | Pollitt | H04M 7/006 379/87 |

(Continued)

FOREIGN PATENT DOCUMENTS

| | | |
|---|---|---|
| IN | 1019/DEL/2008 | 10/2010 |
| IN | 326111 | 11/2019 |

OTHER PUBLICATIONS

Bao, Xuan, and Romit Roy Choudhury. "Movi: mobile phone based video highlights via collaborative sensing." Proceedings of the 8th international conference on Mobile systems, applications, and services. 2010. (Year: 2010).*

(Continued)

*Primary Examiner* — Sharad Rampuria
(74) *Attorney, Agent, or Firm* — Emanus, LLC; Willie Jacques (57) ABSTRACT

A method of playing media content in a telecommunication network is disclosed. The method involves uploading media content on a server (100) by a caller device (400). The method further includes selecting at least one callee device (500) from a contact list of the device (400) via a predefined application (300). Further, the method includes forwarding the content from the server to a selected callee device (500). The method is followed by outputting the content by the application (300) on the selected device (500). The content is selected by the device (400), and the content is output at least one of when the selected device (500) is receiving a call (Continued)

Playing media content when selected callee device receiving a call from a caller device from the device (400) or the selected device (500) is commencing the call to the device (400), the content being played on the selected device (500) by capturing ring signal via a ring signal capturing module (250).

17 Claims, 6 Drawing Sheets

(56) References Cited

U.S. PATENT DOCUMENTS

| | | | | |
|---|---|---|---|---|
| 2010/0135473 A1* | 6/2010 | Dewing | ............... | H04L 65/1101 379/88.13 |
| 2011/0107379 A1* | 5/2011 | Lajoie | ................... | H04L 65/612 725/151 |
| 2012/0213346 A1* | 8/2012 | Gao | ................. | H04M 3/42017 379/93.01 |
| 2014/0321625 A1* | 10/2014 | Brown | ................... | H04M 15/61 379/93.12 |
| 2021/0021649 A1* | 1/2021 | Rathod | ............... | H04L 65/1076 |

OTHER PUBLICATIONS

Moi, Matthias, et al. "Strategy for processing and analyzing social media data streams in emergencies." 2015 2nd International Conference on Information and Communication Technologies for Disaster Management (ICT-DM). IEEE, 2015 (Year: 2015).*

* cited by examiner

Playing media content when selected callee device receiving a call from a caller device

Fig.3

Playing media content when selected callee device commencing a call to a caller device

METHOD AND SYSTEM FOR PLAYING MEDIA CONTENT IN TELECOMMUNICATION NETWORK

This application claims benefit of provisional application number 201911022264 filed on 5 Jun. 2019

FIELD OF THE INVENTION

The present invention relates to providing media content in a telecommunication network. More specifically, the present invention discloses a method and system of playing media content in a telecommunication network comprising plurality of mobile communication terminals.

BACKGROUND OF THE INVENTION

In this advance era, uses of mobile phones are quite common. The mobile phone is an extremely personal device. Today, mobile phones can be utilized for much more than just making and receiving calls. Most commonly, each individual is known about the use of mobiles.

Further, people are aware of uses and services that are provided through mobile phones. A mobile phone also known as a caller device, hand phone, wireless phone, cell phones or cellular phone used for data communication over a network. Mobiles are running via mobile communication terminals. This terminal also supports multimedia communication including images and videos, as well as data communications including symbols, numbers, and characters.

On the other hand, product suppliers these days carry out numerous advertisements, i.e., non-personal information providing activities, for the promotion of the sales of the goods and the enhancement of public relations. While traditional advertisement media include television and radio broadcasting, newspapers, and magazines, banner advertisements or insertion advertisements in Internet contents are prevailing nowadays. In particular, short message advertisements utilizing the short message service (herein below, referred to as "SMS") is emerging as a new advertisement medium recently.

However, the short message advertisement may have some limitations in the advertisement effect. First, a short message transmitted through the SMS is so short that the advertisement sponsor cannot express the message in detail.

More specifically, since the mobile terminal is an apparatus mainly targeted for personal communication, most users are not interested in junk messages such as the advertisement short messages and likely to delete the messages just after the receipt of the messages. Considering that most advertisement short messages are directed for sales promotion of goods, such phenomenon may disappoint the sponsors.

With the development of high-quality mobile phones, a mobile communication base station provides not only a voice communication service but also various contents such as stock, weather, sports, entertainment, and current events, etc. With the increase in terminal usage time and frequency, service providers have sought a method of providing advertisements through the mobile communication terminal.

Further, it has been found that these days more and more mobile phone users prefer to have conversations over their speaker phones. In other words, they like to talk to other users by using the microphone and speaker of mobile phones while multitasking other activities, like working, doing daily chores, diving etc. In such a scenario, there is a need to provide advertisement in a telecommunication network, wherein advertisements could be pushed on mobile phones at the moment when users are conversing on mobile phones through speaker phones.

Granted Indian patent number 326111 titled "SYSTEM AND METHOD FOR BRAND PROMOTION THROUGH PHONE/MOBILE TECHNOLOGIES" granted to the present applicant describes a method of playing media content only when the user is commencing a call to another user, and the media content is automatically selected by the system, based on the selected service of the user.

In another patent application no. 1019/DEL/2008 filed by the present application discloses a method and system for playing advertisement via ring tone. Further, the media content is automatically selected by the system, based on the selected service.

Therefore, a method and a system for playing the media content in a telecommunication network is required which may overcome above discussed drawbacks, and provide easy to operate and a cost-effective method.

SUMMARY OF THE INVENTION

In an aspect of the present invention, a method of playing media content in a telecommunication network comprising plurality of mobile communication terminals is disclosed. The said network includes a caller device and a calling device.

The said method involves uploading media content on a database of a server by a caller device via an uploading module. The method is followed by selecting at least one callee device from a contact list of the said caller device via a predefined application. The said predefined application is downloaded on the caller device and the callee device.

Further, the said method is followed by forwarding the said media content from the said server to the predefined application of a selected callee device via a forwarding module. The method further includes downloading the said media content on the said selected callee device via an auto downloading module. The said media content is downloaded on the at least one selected callee device via an internet network. At last, the method includes outputting the said media content by the predefined application on the said at least one selected callee device via a playing module.

In an embodiment of the present invention, the said media content is selected by the caller device, and the said media content is output when the said at least one selected callee device is receiving a call from the caller device or the said at least one selected callee device is commencing the call to the caller device.

In the embodiment of the present invention, the said media content being played on the at least one selected callee device by capturing ring signal via a ring signal capturing module.

In the embodiment of the present invention, said media content is selected from at least one of video, audio message, screen saver, scrolling text, multimedia, background music, video, display banner, or like.

In one embodiment of the present invention, the method includes detecting of the said ring signal of the at least one selected device via a telecommunication ring signal detecting module. The said ring is either incoming call ring signal or outgoing call ring back signal.

In one embodiment of the present invention, the method includes capturing of the incoming ring signal via the said ring signal capturing module. The said incoming call ring signal is captured to play the said media content on the at least one selected callee device.

In another embodiment of the present invention, the method includes capturing of the ring back signal via the said ring signal capturing module. The said outgoing call ring back signal is captured to play the said media content on the selected callee device.

In other aspect of the present invention, a system for playing media content in a telecommunication network comprising plurality of mobile communication terminals is disclosed. The said system includes a server having a database adapted to store the media content. The said system further includes a predefined application downloaded on a caller device and a callee device.

Further, the said predefined application is adapted to upload the selected media content on the said server by the caller device via an uploading module. The said application is further adapted to select at least one callee device (500) from a contact list of the said caller device.

The said predefined application is further adapted to download the said media content from the said database of the said server on the at least one selected callee device via an auto downloading module. The said media content is downloaded when the internet network is active. The said application is further adapted to output said media content on the at least one selected callee device via a playing module.

In this embodiment of the present invention, the said media content is selected by the caller device (400), and the said media content is output at least one of when the said at least one selected callee device (500) is receiving a call from the caller device (400) or the said at least one selected callee device is commencing the call to the caller device (400).

In the said embodiment of the present invention, the said media content being played on the at least one selected callee device by capturing ring signal via a ring signal capturing module.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

DESCRIPTION OF THE DRAWINGS

The advantages and features of the present invention will become better understood with reference to the following detailed description taken in conjunction with the accompanying drawings, in which.

A method and system for playing promotion media content is explained with reference to FIG. 1-FIG. 6.

Like numerals denote like elements throughout the figures.

DESCRIPTION OF THE INVENTION

The exemplary embodiments described herein detail for illustrative purposes are subjected to many variations. It should be emphasized, however, that the present invention is not limited to a method and system of playing media content comprising plurality of mobile communication terminals in a telecommunication network. It is understood that various omissions and substitutions of equivalents are contemplated as circumstances may suggest or render expedient, but these are intended to cover the application or implementation without departing from the spirit or scope of the present invention.

Further, the following terms have the meanings indicated below.

The terms "a" and "an" herein do not denote a limitation of quantity, but rather denote the presence of at least one of the referenced items.

The terms "having", "comprising", "including", and variations thereof signify the presence of a component.

Figure 1:
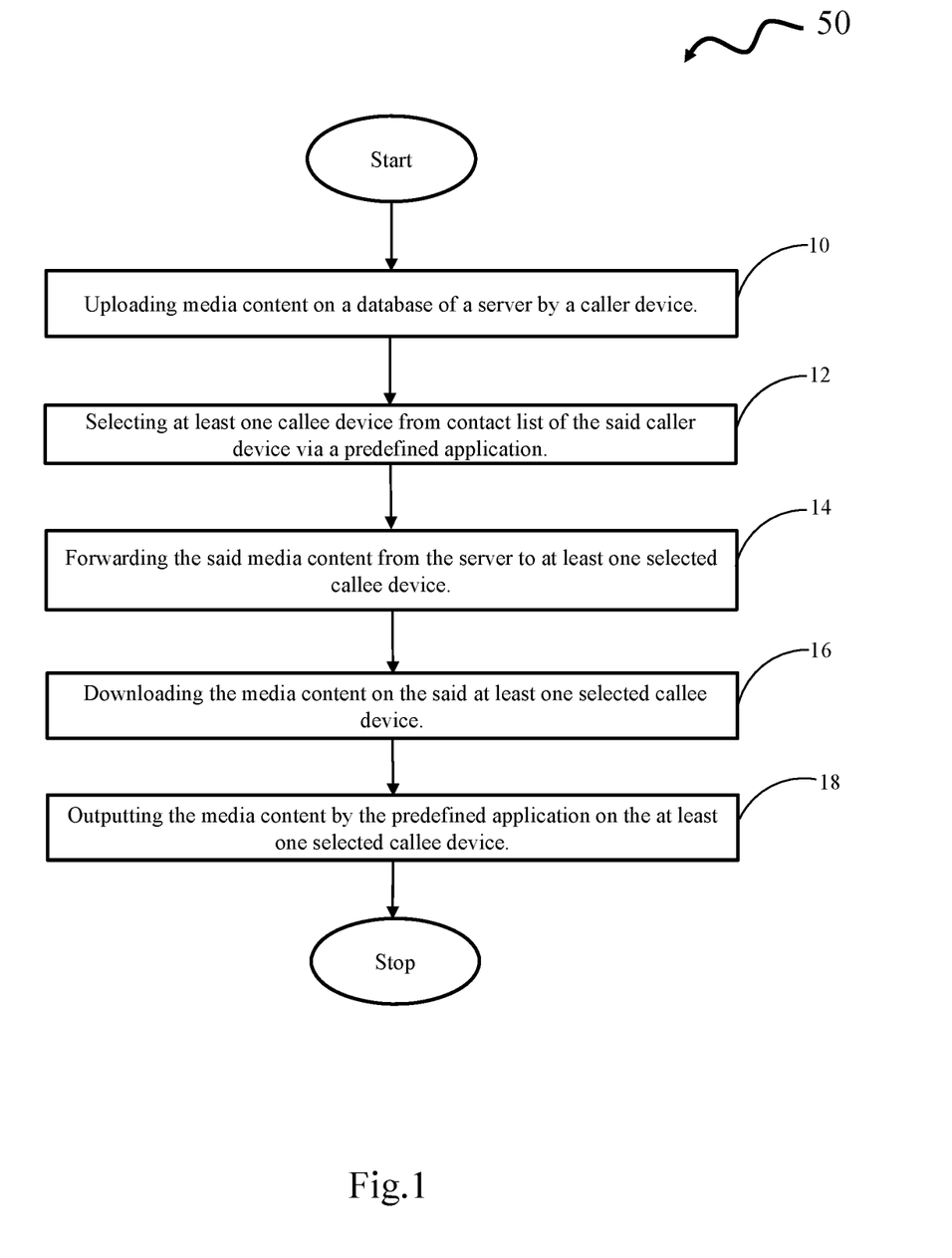
FIG. 1 illustrates a flow chart depicting an exemplary method for playing media content in a telecommunication network, according to various embodiments of the present invention.
Figure 2:
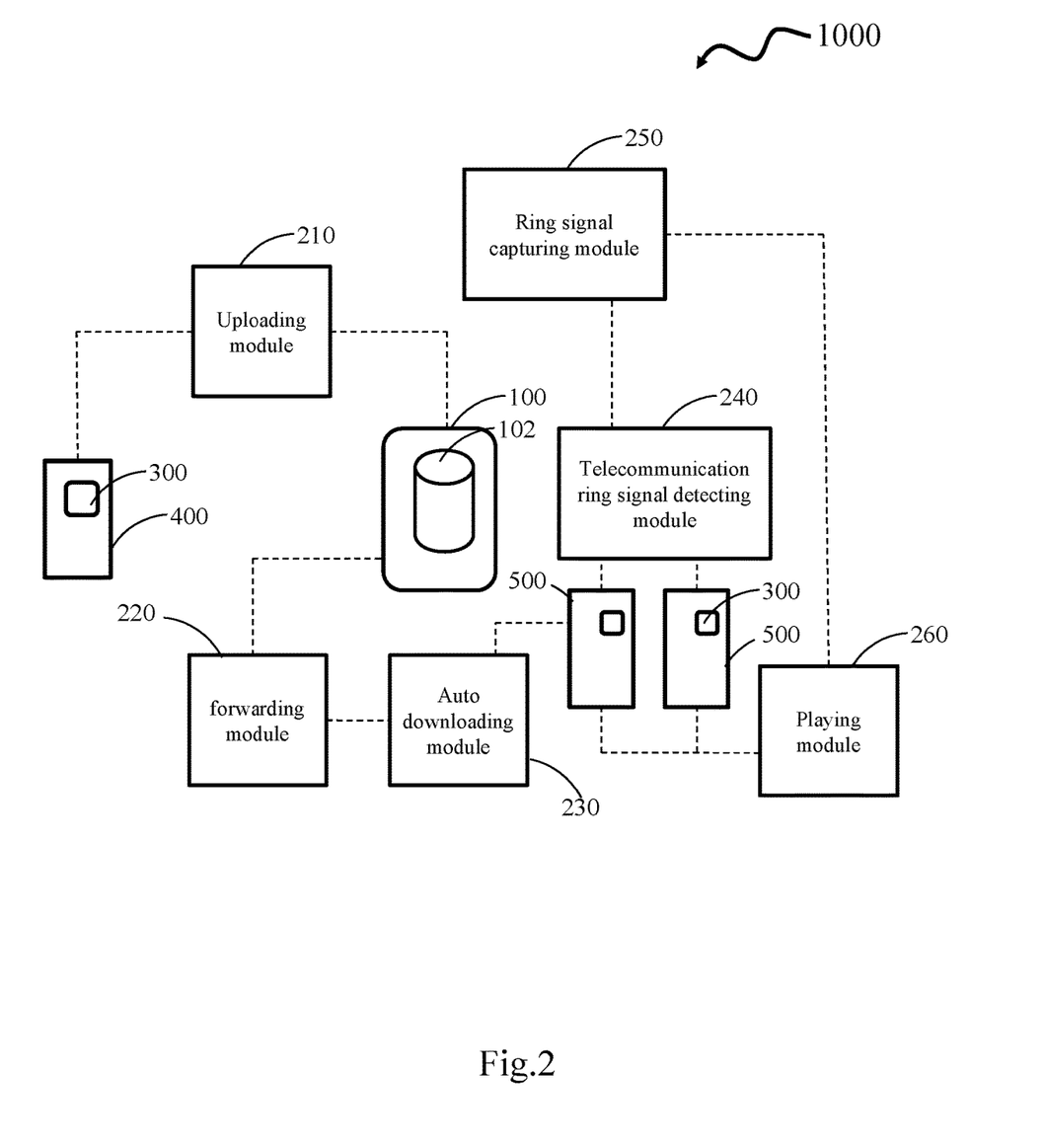
FIG. 2 illustrates an exemplary block diagram representing system of playing media content in a telecommunication network, according to various embodiments of the present invention.

As shown in Figures, and especially FIGS. 1 & 2, a method (50) of playing media content in a telecommunication network comprises a plurality of mobile communication terminals, such as mobile phones. The said method is explained with reference with the flowchart.

Referring to FIG. 1, at step (10), the said method (50) involves uploading media content on a database (102) of a server (100) by a caller device (400). The said media content is uploaded via an uploading module (210).

In another embodiment of the present invention, the said uploading module (210) is adapted to upload details of the media content played in the devices (400), (500). The said details of the said media content are uploaded in the said data base (102) via internet connection.

In one embodiment of the present invention, the said at least one media content includes customized video caller tone, video ring back tone, video ring tone, pre-call video, fixed wallpaper, sliding wallpaper, audio message, screen saver, scrolling text, multimedia, background music, display banners, mobile key pad or location based service (LBS). However, such examples should not be construed as a limitation to the present invention.

At step (12), the said method (50) further involves selecting at least one callee device (500) from contact list of the said caller device (400) via a predefined application (300). The said predefined application (300) is downloaded on the caller device (400) and the callee device (500), and the said application (300) is in communication with the said database (102) of the server (100) (refer FIGS. 1 & 2).

At step (14), the said method (50) further involves forwarding the said media content from the server (100) to the at least one selected callee device (500). The said media content is forwarded via a forwarding module (220).

At step (16), the said method (50) further involves downloading the said media content on the at least one selected callee device (500). The said media content is downloaded via an auto downloading module (230).

In the said embodiment of the present invention, the said media content is downloaded on the said selected callee device (500) via an auto downloading module (230). The said media content is downloaded automatically, whenever the said selected callee device (500) is connected via an internet network.

Further, at step (18), the method involves (50) outputting the said media content by the said predefined application (300) on the said selected callee device (500) of a registered user (refer FIG. 1). The said media content is played via a playing module (260).

In the embodiment of the present invention, the said media content is selected by the caller device (400). Further, the said media content is output at least one of when the said at least one selected callee device (500) is receiving a call from the said caller device (400) or the said at least one selected callee device (500) is commencing the call to the said caller device (400).

In one embodiment of the present invention, the said media content may be played during the telephonic conversation between the caller device (400) and the selected callee device (500).

In another embodiment of the present invention, the said media content is played after disconnecting of the call between the selected callee device (500) and the said caller device (400).

In one embodiment of the present invention, the said media content is played on the selected device (500) when either one of registered user or unregister user calls on the said at least one selected callee device (500).

In one embodiment of the present invention, the selected callee device (500) is having an option to allow the said predefined application (300) to play the said media content (selected by the caller device (400)) or not.

In another embodiment of the present invention, the user of the selected callee device (500) may block the user of the caller device (400) to the select the media content for the said selected callee device (500).

In yet another embodiment of the present invention, the user of the selected callee device (500) is having an option to allow the said predefined application (300) to play the said media content for only the said caller device (400) (selected the media content), or for any caller devices.

In the embodiment of the present invention, the said media content being played on the selected callee device (500) by capturing ring signal via a ring signal capturing module (250) (refer FIG. 2).

In the embodiment of the present invention, the said media content is one of tracking information, live audio/video from the user of the caller device (400), emergency alert messages, or like.

In one embodiment of the present invention, the said ring signal of the selected callee device (500) is detected via a telecommunication signal detecting module (240) (refer FIG. 2).

In the embodiment of the present invention, the telecommunication signal detecting module (240) detects all kind of incoming and outgoing signals such as ringtone signals, ring back tone signals and the like.

In the embodiment of the present invention, the said ring signal is either incoming call ring signal or outgoing call ring back signal.

In one embodiment of the present invention, the ring signal capturing module (250) includes an incoming calling signal capturing module (252) for capturing the said incoming call ring signal.

Figure 3:
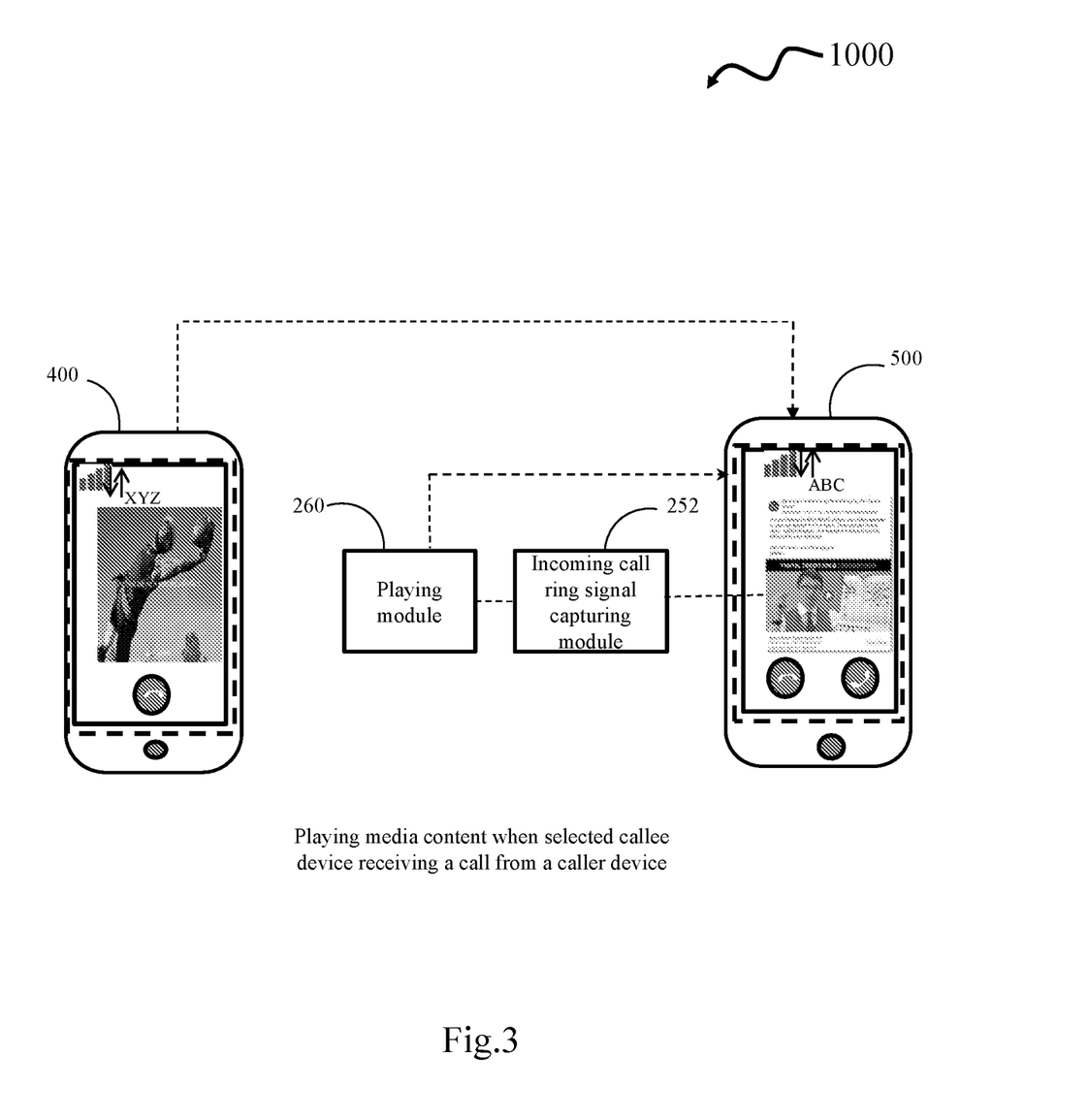
FIG. 3 illustrates a schematic diagram representing system of playing selected media content on the selected callee device in a telecommunication network, when the selected callee device receiving a call from a caller device, according to various embodiments of the present invention.

In the embodiment of the present invention as shown in FIG. 3, specifically, when the selected callee device (500) is receiving the call from the said caller device (400), the incoming call ring signal will get captured by the incoming call ring signal capturing module (252) to play the said media content on the said selected device (500) via the playing module (260).

In the embodiment of the present invention, if the caller device (400) has selected more than one callee device (400), subsequently, the same media content which is selected by the caller device (400), may be played on all the selected caller devices (500).

In one embodiment of the present invention, the caller device (400) is a registered user. More specifically, promotion media content may also play on the caller device (400), whenever the user of the caller device (400) call to the selected callee device (500) (refer FIG. 3).

In the said embodiment of the present invention, the promotional media content played on the said caller device (400) is based on a service selected by the said caller device (400).

In another embodiment of the present invention, if the caller device (400) is now having the said application, and the said user is commencing a call to the said selected callee device (500), the media content may play only on the selected callee device (500).

Figure 4:
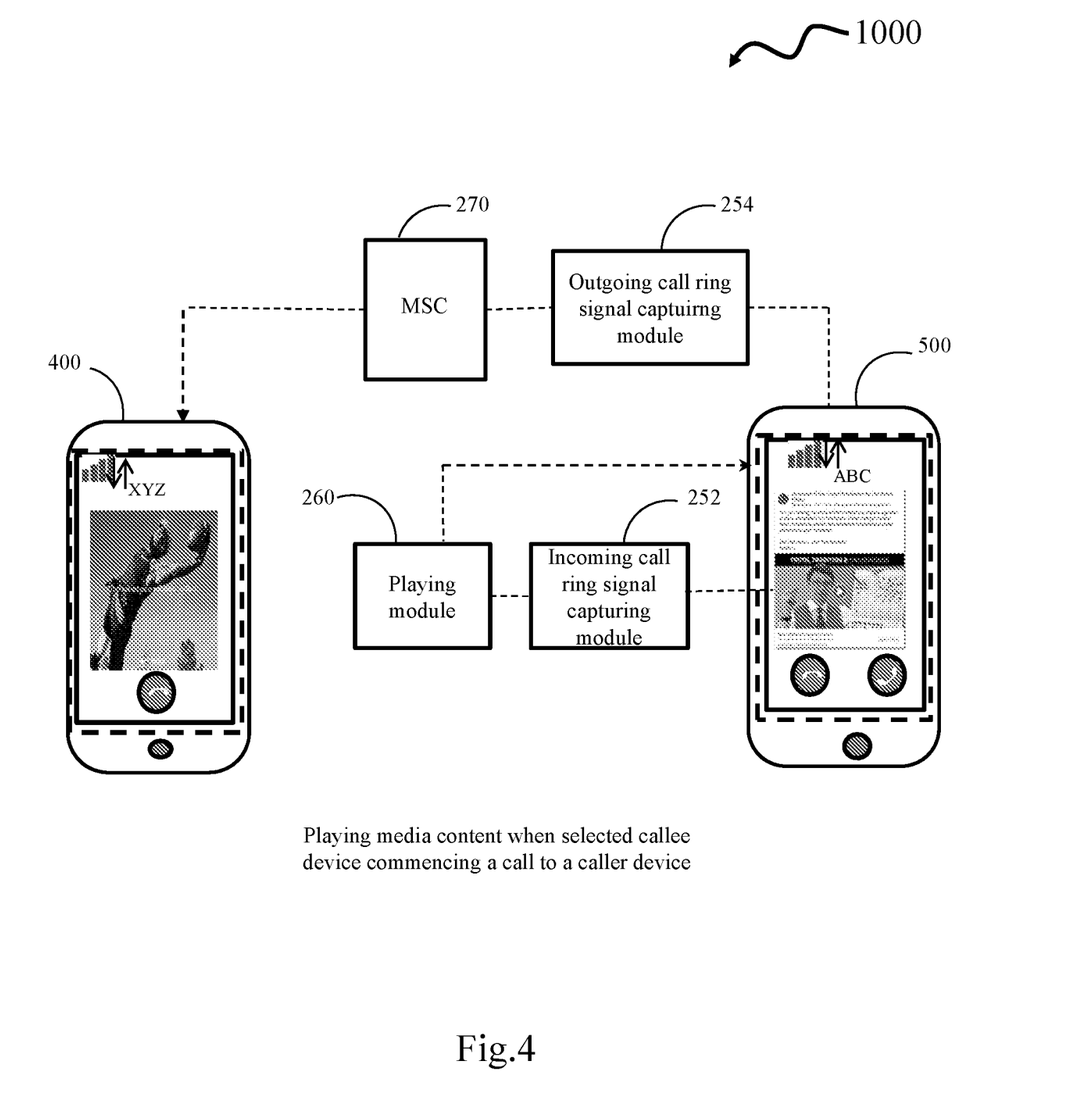
FIG. 4 illustrates a schematic diagram representing system of playing selected media content on the selected callee device in a telecommunication network, when the selected callee device commencing a call to a caller device, according to various embodiments of the present invention.

In another embodiment of the present invention, the ring signal capturing module (250) includes an outgoing call ring signal capturing module (254) for capturing outgoing call ring back signal of the said selected callee device (500).

In the embodiment of the present invention as shown in FIG. 4, specifically, when the selected callee device (500) is commencing the call to the said caller device (400), the outgoing call ring back signal will get captured by the outgoing call ring signal capturing module (254) to play the said media content on the said selected device (500) via the playing module (260).

In the embodiment of the present invention, the outgoing call transfer to the said caller device (400) through a mobile switch center (MSC) (270) (refer FIG. 4).

FIG. 2 illustrates an exemplary block diagram of a system (1000) for playing media content in a telecommunication network comprising plurality of mobile communication terminals. The said system (1000) includes a server having a database (102) adapted to store plurality of media contents. The said system further includes a predefined application (300) downloaded on a caller device (400) and a callee device (500).

Further, the said predefined application (300) is adapted to upload the selected media content on the said server (100) by the caller device (400) via an uploading module (210). Further, the said application (300) is adapted to select at least one callee device (500) from a contact list of the said caller device (400).

In the embodiment of the present invention, the said predefined application (300) is further adapted to download the said media content from the said database (102) of the said server (100) on the at least one selected callee device (500) via an auto downloading module (230). Furthermore, the said application (300) outputs the said media content on the at least one selected callee device (500) via a playing module (260)

In the embodiment of the present invention, the said media content is selected by the caller device (400). Further, the said media content is output at least one of when the said at least one selected callee device (500) is receiving a call from the said caller device (400) or the said at least one selected callee device (500) is commencing the call to the said caller device (400).

In another embodiment of the present invention, the said media content is played on the selected device (500) when either registered user or unregister user call on the said at least one selected callee device (500).

In one embodiment of the present invention, the said system (1000) is adapted to play the tracking information of any courier or like.

In the embodiment of the present invention, the system (1000) includes a Unique Identity number (UID) generating module to generate UID of the registered user.

In an exemplary embodiment of the present invention, the system includes a postal UID generating module. The said postal UID generating module generates the postal UID of the registered user of the said application (300). The said UID of the user may be used by the courier company to track details of the said user.

In the embodiment of the present invention, whenever the any courier associated with the said UID uploads on the server of the courier company. Subsequently, the server (100) of the system (1000) receives the tracking information of the said courier.

In the said embodiment of the present invention, when the user receives the call from another user or the user call to another user. Accordingly, the said tracking information will play on the said devices (400), (500).

In one embodiment of the present invention, the said system (1000) is adapted to output emergency alert messages or like.

In the embodiment of the present invention, the system (1000) includes an outbound dialing (OBD) system and the Interactive voice response (IVR) system. Further, the primary rate interface (PRI) and basic rate interface BRI cards are configured in the server of the IVR System. The said cards are configured for calling multiple users via the said outbound dialing system.

Figure 5:
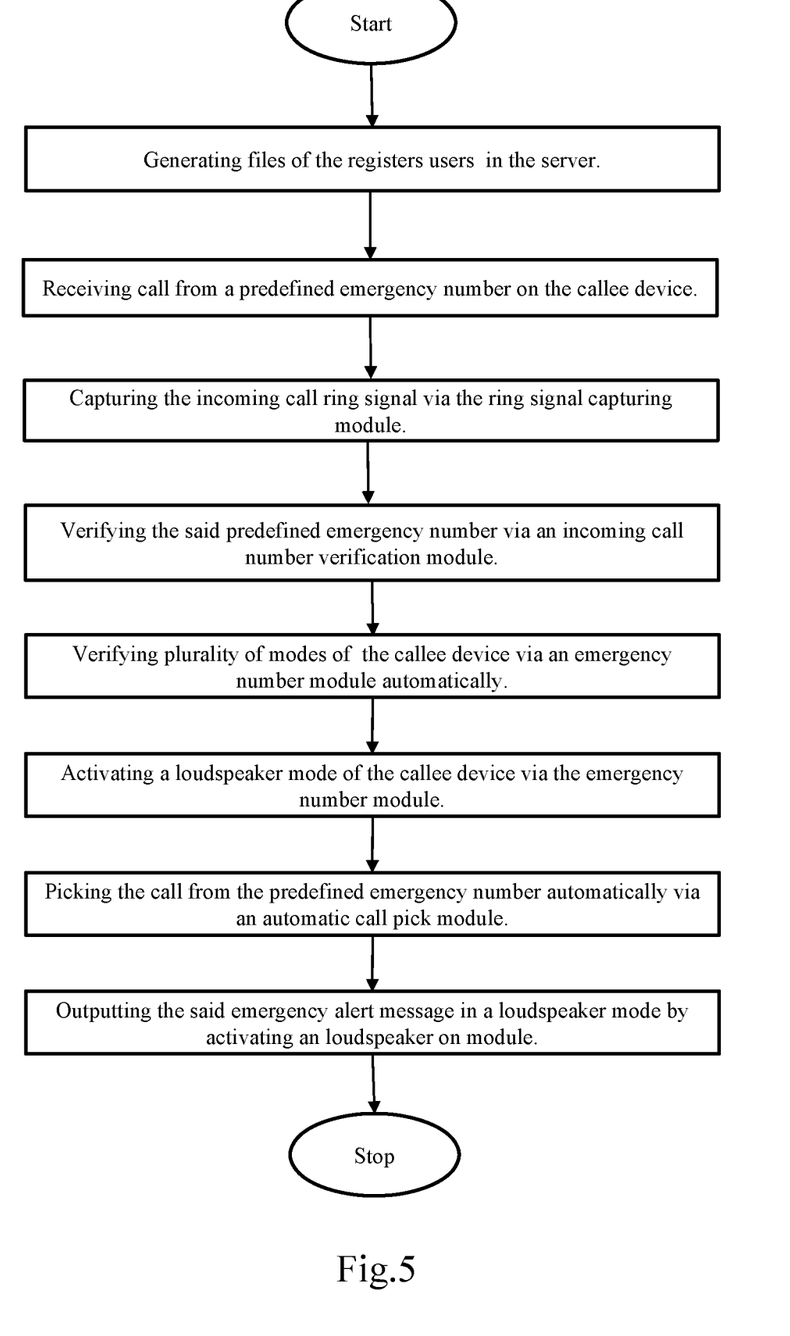
FIG. 5 illustrates a flow chart depicting steps for outputting an emergency alert messages on the callee device from a predefined emergency number, according to various embodiments of the present invention.

In an aspect of the present invention as shown in FIG. 5, the files of registers users may generate in the server (100) to call the said users in the emergency time. The said files may generate on the basis of age, sex, or area or like.

In the embodiment of the present invention, the system (1000) is adapted to receive the incoming call from a predefined emergency number. Further, the incoming call ring signal of the callee device (500) is captured via the said incoming call ring signal module (252) (refer FIG. 5).

In the embodiment of the present invention, the said system includes an incoming call number verification module. The said verification module verifies that that incoming call is an emergency number. Subsequently, an emergency number module of the system (1000), verifies that the mode of the device (500) (refer FIG. 5).

In the exemplary embodiment of the present invention, if the callee device (500) is in call waiting, then the said emergency number module disconnects the call, and connects the call with the emergency number.

In another exemplary embodiment of the present invention, the said emergency number module activates a loudspeaker mode of the device (500).

In yet another embodiment of the present invention, the said emergency number module automatically picks up the call via an automatic call pick module. Further, the loudspeaker on module is activated to output the said emergency alert message in loudspeaker mode.

In one embodiment of the present invention, said emergency number module play the emergency alert messages in a form of wallpaper, news or like for the deaf users.

In another embodiment of the present invention, the said emergency number module is adapted to connect with the family members.

In the exemplary embodiment of the present invention, the phone of any of the family member is in silent mode or not receiving call. The said caller calls the predefined service emergency number. Subsequently, the system automatically connects the call with the family members of the caller.

Figure 6:
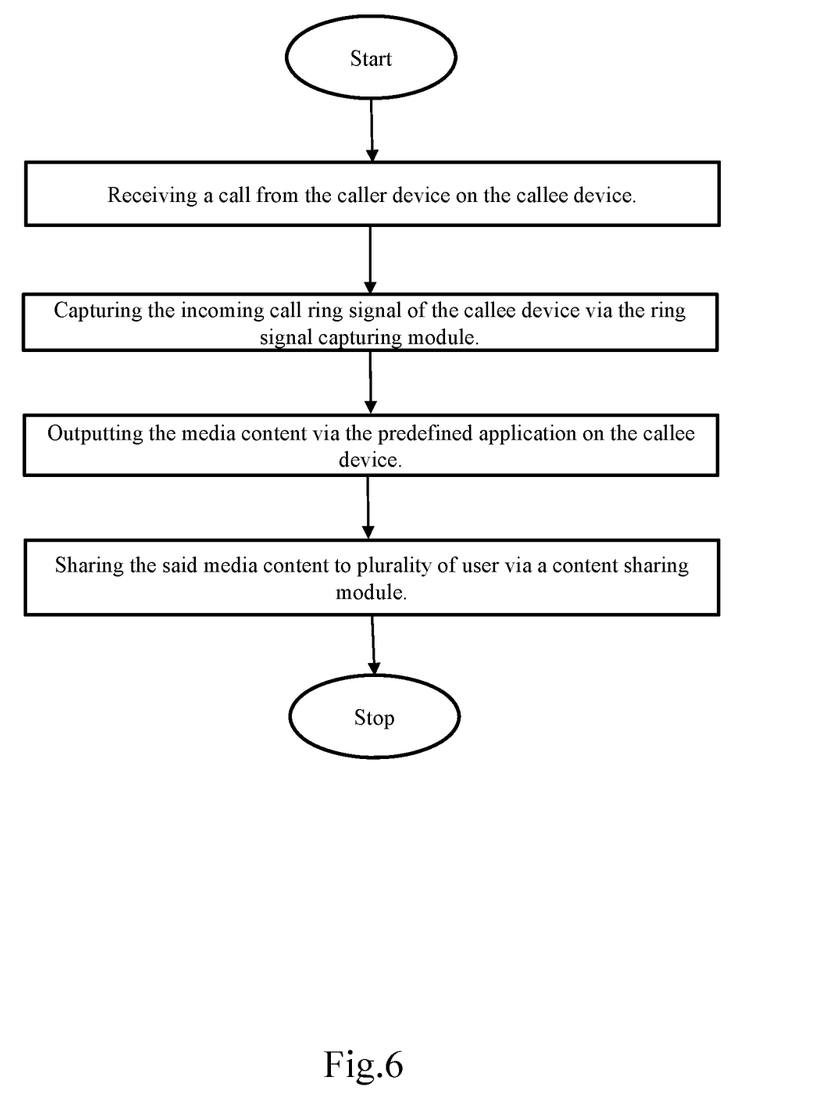
FIG. 6 illustrates a flow chart depicting steps for sharing outputted media content via a content sharing module, according to various embodiments of the present invention.

In another aspect of the present invention as shown in FIG. 6, the system (1000) includes a content sharing module to share the media content with the plurality of users. The said plurality of users may be the registered users or the unregistered users.

In the embodiment of the present invention, the sharing of the media content from the callee device (500) includes following steps. The step includes receiving the call from the caller device (400). The step further includes capturing the incoming call ring signal via the incoming call ring signal module (252) (refer FIG. 6).

The step is followed by outputting the media content via the predefined application (300) on the callee device (500). Further, the step includes sharing the said media content via the said content sharing module (refer FIG. 6).

In the embodiment of the present invention, the media content is shared by tapping the share button on the screen of the callee device (500).

In the embodiment of the present invention, the said media content is shared when the callee device (500) is at least one of receiving the call from the caller device (400), during the telephonic conversation between the callee device (500) and the caller device (400), or after disconnecting of the call.

In another embodiment of the present invention, the media content is also shared from both the caller device (400) and callee device (500).

In one embodiment of the present invention, the system (1000) includes a telecommunication signal detecting module (240) adapted to detect a ring signal of the at least one selected callee device (500).

In another embodiment of the present invention, the said telecommunication signal detecting module (240) adapted to detect the ring signal of the both the one selected callee device (500) and the caller device (400).

In one embodiment the present invention, the system further includes a call action module to perform an action on incoming call that enables service providers to derive monetary benefit while providing a content or information over the communication network.

In the embodiment of the present invention, system further includes a look up module configured to identify information, content, one or more services, or tasks to be provided based on the identified caller IDs.

In one embodiment the present invention, the system further includes a customization module adapted to customize the media content as per the user's choice.

In one embodiment of the present invention, the system (1000) includes an unlock module adapted to unlock the caller device (400) of the user. The said devices (400), (500) are unlocked to play the said promotion media content on the said devices (400), (500).

In one embodiment of the present invention, the system (1000) further includes auto mobile operating module adapted to operate the said devices (400), (500) by any other personal computer or mobile phone.

In one embodiment of the present invention, the system (1000) further includes user registration module. In the said user registration module, the user downloads the said pre-defined application (300) on devices (400), (500) and registers his mobile number and name on the said application (300) and creates a user panel.

In one embodiment of the present invention, the said system (1000) includes user panel. The user panel is adapted to view his account related information, select the services, upload and download the content, use the tracking and matching module, activate-deactivate the services and share information to others.

In one embodiment of the present invention, the system (1000) further includes intelligent user profile updating module. The said intelligent user profile updating module updates the user profile automatically as per the user's pre-selected choices.

In one embodiment of the present invention, the said system (1000) includes service provider panel. The service provider module is adapted to create user's account in the said application (300). The service provider forwards the media contents to the targeted user through the said service provider panel.

In one embodiment of the present invention, the system (1000) further includes intelligent user profile matching module. The said intelligent user profile matching module helps the service provider to identify the number of users with respect to the content/service/product that is uploaded by the service provider.

Further, the intelligent user profile matching module helps in categorizing the number of users in respect of the content/service/product. Furthermore, the intelligent user profile matching module helps in categorizing the users as per their location. Such kind of filtration and categorization helps the service provider to get the right users.

In one embodiment of the present invention, the system (1000) further includes content adjustment module. The said content adjustment module adjusts the downloaded content as per content type.

In one embodiment of the present invention, the said system (1000) further includes screen saver module. The said module runs various kinds of themes, wall papers, screen savers and the like content on the mobile's screen.

In the embodiment of the present invention, the said content displaying module uses the incoming call ring signal to display the media content on the screen of the selected callee device (500). The media content plays on the mobile's screen until the call gets attended disconnected or rejected. When the incoming call ring signal stops, the ring signal displaying module notifies a ring signal action module.

In the embodiment of the present invention, the system includes a ring signal action module to verify the call details such as from which number the last call was made. Further, the ring signal action module checks such as for how much time the multimedia content was played on the mobile, which multimedia content was played and the like. Such kinds of details are sent from the ring signal action module to a time line updating module.

Further, the time line updating module updates the details received from the ring signal action module in the data updating module and forwards it to the forwarding module.

In one embodiment of the present invention, the said system (1000) further includes a transaction verification module. In the said embodiment, the database (102) sends all the transactions/details to the said transaction verification module to verify the details.

In one embodiment of the present invention, the said system (1000) further includes signal tracking and matching module. The service provider updates detailed information about his services or products in his service provider panel along with location and stock. When the user selects the services or products, a notification related to user's location and requirement are communicated to the service provider.

In one embodiment of the present invention, the said system (1000) includes Location signal tracking and matching module. When the user selects or updates a service or a product while the signal tracking and matching module is in ON state, the matching module checks the database and provides information about availability, location and the like of the service or product.

Further, the location tacking and matching module helps in fetching the exact location of the user and the exact location where the services or products are available. Whenever the user en-routes to that location, the server (100) sends notification to the user about other locations where the product or service is available in that route and how far the user is from that other location.

In one embodiment of the present invention, the said system (1000) further includes live survey and feedback handling module. The said live audio survey and feedback handling module is adapted to take feedback of the said services or the plurality of promotion media contents or the like.

In the said embodiment of the preset invention, whenever the user wants to use the live survey and feedback module, the user will first connect the caller device)/callee device with internet. Further, the user activates the live audio survey and feedback handling module.

Subsequently, a server (100) will be connected to the live audio survey and feedback handling module. The said live audio survey and feedback handling module will then activate the performing module and the performing module sends the last updated promotion media content from the auto uploading module to the playing module. The playing module will play the audio content on the screen of the user's mobile and activate audio recording module.

In the said embodiment of the present invention, the audio content includes multiple questions. Accordingly, the user answers the multiple questions by using touch pad/buttons or through voice commands/response. When this task ends, the audio detecting module detects the responses and sends the response to the new file generator module.

In the embodiment, the feedback is taken via capturing video of the user. In the other words, video based feedback can also be provided by the user through the camera of the devices (400), (500).

In yet another embodiment, the feedback can be entered in text form by using the touch button of the devices (400), (500).

In one embodiment of the present invention, the said system (1000) further includes new file generator module. The said new file generator module receives the responses/feedback and save the response file with a new name.

In one embodiment of the present invention, the said system (1000) further includes a modem, a service/product information uploading electronic device, a call handling module, an audio/video/text detecting module, an editing and recording module, a new file generator module, a keypad detecting and working module, a service number auto dialing module, a screen lock opening module, a ring signal lock capturing module, and a ring signal lock verification module.

In one embodiment of the present invention, the said devices (400), (500) include Normal Phones (Non GPRS and Non 3G/4G/5G). Accordingly, the promotion media content for the said normal phones is in form of at least one of SMS text advertisement, Scrolling text, Screen saver, Voice message, Background advertisement, Precall ads, Caller tune or Dialer ads.

In another embodiment of the present invention, the said devices (400), (500) include advance Phones or smart phones (with GPRS and 3G/4G/5G technologies). Accordingly, the promotion media content for the said advance phones is in form of at least one of Caller Ring Back Tone, Customized Caller Tone, Customized Video Caller Tone, Video Ring Back Tone, Video Ring Tone, Ring Tone, Pre-Call Audio Message, Dialer Call, During Call in Conference, Video Message, Wallpaper (Fixed or Sliding), Audio Message, Screen Saver, Scrolling Text, Dialer based IVRS Call, Text Message, Multimedia Messages, 3G/4G Video, SMS, MMS, Background music, Hyperlinks, Search Engine, Banner, Mobile Key Pad, Service message LBS (Location Based Service), USSD Message or Voice message.

In one embodiment of the present invention, the users will be classified into two categories, first one is registered user second one is unregistered users. The registered users will provide their complete details to the service provider and at any moment they can update their details as well as user categories or service provider can ask for the categories.

In the embodiment of the present invention, the registered members will be rewarded with credit points for reading listening of the plurality of media contents and get benefit of rewarded points at any moment. Whereas the unregistered members can avail the benefits of contents services, and will get rewarded for some credit points for using the said services, but unregistered user will get benefit of rewarded points after registration.

Therefore, with such facilities the present invention would be beneficial for companies, general consumer and government, as well.

Beneficial for Companies
1. Large sale of product in less time.
2. Advertisement will be available to particular user on the basis of interested area.
3. It would be inexpensive and best.
4. Large production, due to fewer prices.
5. Facilities will provide according to particular area.
6. Direct contact with the customer is possible.
7. Small & new generate companies will grow in very short time.
8. In short duration and with less expense product will sale with high speed.

Beneficial for General Consumer
1. User will get particular advertisement of their benefits.
2. User can store particular advertisement of their use and take advantage in future.
3. User can directly come in contact of us.
4. User can easily aware regarding advertisement of their benefits.

Beneficial for Government
1. Advertisement will available at low price, so that product cost will be less automatically.
2. Through the advertisement, public may get emergency news.

Finally, all such facilities enhance the use of the promotion media content and because of its fewer prices it get popular in shortest time.

Therefore, in the present invention the user may select the media content for the selected callee device, thereby said media content play on the said selected callee device.

Further, the present invention also provides interactive services, value added services and enhances the telephonic communication device feature.

Further, the media content can be played not only during the ringing phase but also during telephonic conversation between the users and after disconnecting the call between the users.

Furthermore, the present invention provides playing of the promotion media connect by utilizing the call ring signal.

In addition, the present invention provides a user to play track information of any booking, product or like.

Therefore, the present invention is a system and a method of playing media content in a telecommunication network, which is feasible, effective, and efficient as compared to existing methods.

The foregoing descriptions of specific embodiments of the present invention have been presented for purposes of description. They are not intended to be exhaustive or to limit the present invention to the precise forms disclosed, and obviously many modifications and variations are possible in light of the above teaching.

Further, the embodiments were chosen and described in order to best explain the principles of the present invention and its practical application, and thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

The invention claimed is:

1. A method (50) of playing media content in a telecommunication network, the telecommunication network comprising a plurality of mobile communication terminals, the method (50) comprising:

uploading media content on a database (102) of a server (100) by a caller device (400) via an uploading module (210);

selecting, by the caller device (400), at least one callee device (500) from a contact list of the caller device (400) via a predefined application (300), wherein the predefined application (300) is downloaded on the caller device (400) and the callee device (500);

forwarding the media content from the server (100) to the predefined application (300) of at least one selected callee device (500) via forwarding module (220);

downloading the media content on the at least one selected callee device (500) via an auto downloading module (240);

outputting the media content by the predefined application (300) on the at least one selected callee device (500) via a playing module (260), characterized in that, the media content is selected by the caller device (400), wherein the media content is one of tracking information, live audio/video of the caller device (400), and emergency alert messages, and the media content is outputted when, the at least one selected callee device (500) is receiving a call from the caller device (400), or the at least one selected callee device (500) is commencing the call to the caller device (400), wherein the media content being played on the at least one selected callee device (500) by capturing ring signal via a ring signal capturing module (250), wherein outputting the emergency alert messages comprising:

receiving the call from a predefined emergency number on the callee device (500), verifying the predefined emergency number via an incoming call number verification module, picking the call automatically via an automatic call pick module, and outputting the emergency alert message in a loudspeaker mode by activating an loudspeaker on module.

2. The method (50) as claimed in claim 1, wherein the media content is selected from at least one of video, audio message, screen saver, scrolling text, multimedia, background music, video, and display banners.

3. The method (50) as claimed in claim 1, wherein the media content is downloaded on the at least one selected callee device (500) via an internet network.

4. The method (50) as claimed in claim 1 comprising detecting of the ring signal of the at least one selected device (500) via a telecommunication ring signal detecting module.

5. The method (50) as claimed in claim 4, wherein the ring signal is either incoming call ring signal or ring back signal.

6. The method (50) as claimed in claim 5 comprises capturing of the incoming ring signal via the ring signal capturing module (252), wherein the incoming call ring signal is captured to play the media content on the at least one selected callee device (500).

7. The method (50) as claimed in claim 5 comprises capturing of the ring back signal via the ring signal capturing module (254), wherein the outside call ring back signal is captured to play the media content on the selected callee device (500).

8. The method as claimed in claim 1 comprising sharing the media content via a content sharing module, the media content is shared with at least registers users or unregistered users when the callee device (500) is at least one of receiving the call from the caller device (400), during the telephonic conversation between the callee device (500) and the caller device (400), or after disconnecting of the call.

9. A system (1000) for playing media content in a telecommunication network, the telecommunication network comprising a plurality of mobile communication terminals, the system (1000) comprising:

a server (100) comprising:

a database (102) adapted to store the media content; and a predefined application (300) downloaded on a caller device (400) and a callee device (500), the predefined application (300) is adapted to, upload the selected media content on the server (100) by the caller device (400) via an uploading module (210), select at least one callee device (500) from a contact list of the caller device (400), download the media content from the said database (102) of the server (100) on at least one selected callee device (500) via an auto downloading module (230), and output the media content on the at least one selected callee device (500) via a playing module (260), characterized in that, the media content is selected by the caller device (400), wherein the media content is one of tracking information, live audio/video of the caller device (400), and emergency alert messages and the media content is outputted when the at least one selected callee device (500) is receiving a call from the caller device (400), or the at least one selected callee device (500) is commencing the call to the caller device (400), wherein the media content being played on the at least one selected callee device (500) by capturing ring signal via a ring signal capturing module (250), wherein outputting the emergency alert messages comprising:

receiving the call from a predefined emergency number on the callee device (500), verifying the predefined emergency number via an incoming call number verification module, picking the call automatically via an automatic call pick module, and outputting the emergency alert message in a loudspeaker mode by activating an loudspeaker on module.

10. The system (1000) as claimed in claim 9 comprises a forwarding module (220) adapted to forward the media content from the server (100) to the at least one selected callee device (500).

11. The system (1000) as claimed in claim 9, wherein the media content is selected from at least one of video, audio message, screen saver, scrolling text, multimedia, background music, video, or display banners.

12. The system (1000) as claimed in claim 9, wherein the media content is downloaded on the at least one selected callee device (500) via an internet network.

13. The system (1000) as claimed in claim 9 comprises a telecommunication signal detecting module (240) adapted to detect a ring signal of the at least one selected callee device (500).

14. The system (1000) as claimed in claim 9, wherein the ring signal is either incoming call ring signal or outgoing call ring back signal.

15. The system (1000) as claimed in claim 14, wherein the ring signal capturing module (250) comprises an incoming call ring signal capturing module (252) adapted to capture the incoming call ring signal of the selected callee device (500).

16. The system (1000) as claimed in claim 14, wherein the ring signal capturing module (250) comprises an outgoing call ring signal capturing module (254) adapted to capture outgoing call ring back signal of the selected callee device (500).

17. The system (1000) as claimed in claim 9 comprises a content sharing module adapted to share the media content via a content sharing module, the said media content is shared with at least registers users or unregistered users when the callee device (500) is at least one of receiving the call from the caller device (400), during the telephonic conversation between the callee device (500) and the caller device (400), or after disconnecting of the call.

* * * * *